United States Patent [19]
Kubitz

[11] 3,801,027
[45] Apr. 2, 1974

[54] APPARATUS FOR CUTTING AND SHREDDING WOOD

[76] Inventor: Wayne H. Kubitz, Rt. 1 Box 840, Sandy, Oreg. 97055

[22] Filed: Mar. 1, 1972

[21] Appl. No.: 230,885

[52] U.S. Cl.................. 241/225, 144/172, 241/294
[51] Int. Cl. ............................................. B02c 4/20
[58] Field of Search........ 241/221, 224, 225, 189 R, 241/191, 235, 293, 294; 144/326 A, 326 B, 172, 162 R

[56] References Cited
UNITED STATES PATENTS

| | | | |
|---|---|---|---|
| 2,825,373 | 3/1958 | Forman | 144/172 |
| 2,813,557 | 11/1957 | Thompson | 144/172 |
| 3,214,106 | 10/1965 | Gorman | 241/221 |
| 3,270,968 | 9/1966 | Hess et al. | 241/221 |
| 3,426,674 | 2/1962 | Testolin | 241/191 X |

FOREIGN PATENTS OR APPLICATIONS

| 916,292 | 7/1954 | Germany | 241/293 |
|---|---|---|---|

*Primary Examiner*—Granville Y. Custer, Jr.
*Assistant Examiner*—Howard N. Goldberg
*Attorney, Agent, or Firm*—Klarquist, Sparkman, Campbell, Leigh, Hall and Winston

[57] ABSTRACT

An apparatus for cutting and shredding wooden materials such as tree limbs and the like includes an inclined chute for receiving the material and delivering the same to a cutting station, a cutting bar mounted at the end of the chute adjacent such cutting station, and a cutting drum in operative juxtaposition to the cutting bar. Manganese steel teeth made by cutting a bar of square cross section on parallel planes forming an acute angle with the longitudinal axis of the bar are welded to the periphery of the drum in a spiral wrap. A feed roll is pivotally mounted at the sides of the chute such that it can float on the materials on the floor thereof to urge the same into contact with the drum.

8 Claims, 10 Drawing Figures

APPARATUS FOR CUTTING AND SHREDDING WOOD

BACKGROUND OF THE INVENTION

This invention relates to apparatus for cutting wood and, more particularly, to apparatus particularly adapted to crushing, shredding and cutting the wood into pieces which exhibit rapid decay characteristics.

A wide variety of apparatus has heretofore been available for cutting wooden materials into chips or pulverizing the same into sawdust. The end products of such apparatus, however, do not decay very quickly. In fact, when spread on the ground, they tend to remain relatively inert and compact and resist biological breakdown.

Such prior apparatus also has been particularly vulnerable to rock and metal which often is embedded in the wood. Nails, rocks and railroad spikes often damage the teeth or cause them to break.

Accordingly, it is the primary object of the present invention to provide an apparatus that will crush, shred and cut wooden materials into pieces that exhibit superior biological breakdown or decay characteristics.

A further object of the present invention is to provide such an apparatus that will be relatively immune to damage from rocks or metallic pieces embedded in or included with the wooden materials.

A further object of the present invention is to provide such an apparatus that will be relatively inexpensive to construct and maintain.

SUMMARY OF THE INVENTION

My apparatus includes chute means for receiving wooden materials and delivering the same to a cutting station. A cutting bar is mounted on one end of the chute means and has a cutting edge on which the material is cut. A cutting drum is positioned adjacent such end of the chute means, the drum being mounted for rotation about an axis transverse to the longitudinal axis of the chute means.

A plurality of hard metal teeth are attached to the periphery of the drum in a spiral wrap. The teeth comprise segmets of a rectangular bar cut on parallel planes, such planes forming an acute angle with the longitudinal axis of the bar. Preferably the teeth comprise manganese steel teeth.

Means are provided to move the wooden material along the floor of the chute to the cutting station, and power means are provided for rotating the drum to cut the same.

DETAILED DESCRIPTION OF PREFERRED EMBODIMENTS

Figure 1:
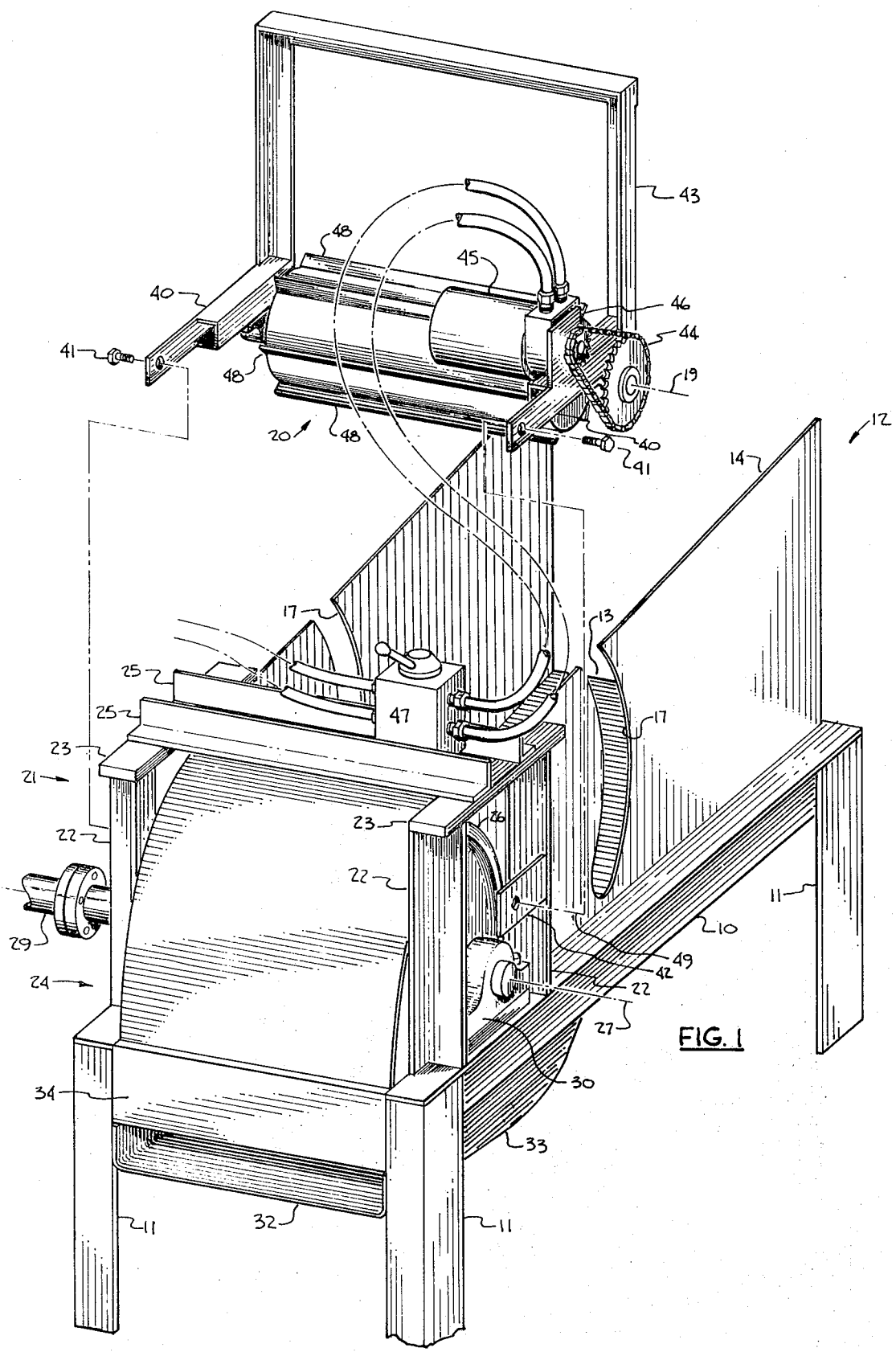
FIG. 1 is a perspective view of an apparatus constructed in accordance with the present invention, portions thereof being shown detached for clarity of illustration.

Referring to the drawings, the apparatus includes a frame 10 having legs 11 and supporting an inclined metal feed chute 12 having a floor 13 and sides 14 supported on angle members 15, 16 at a desired forward pitch. Each of the sides 14 has an arcuate slot 17 cut therein for a purpose hereinafter to be described.

A feed roll 20 adapted to rotate on a horizontal axis 19 is pivotally supported by a structure 21 including vertical angle members 22 and a horizontal top plate 23. The members 22 are welded to the forward end 24 of the frame at each side thereof. Members 22 are joined by horizontal angle members 25 to form an overhead support.

A cutting drum 26 having a horizontal axis 27 transverse to the longitudinal axis 28 of the chute 12 is mounted for rotation in bearings 30 supported on the frame 10 between the vertical members 22 on each side thereof. Power for the drum 26 is provided through a drive shaft 29 from any desired source as, for example, the power takeoff of a farm tractor.

A cutting bar 31 preferably made from 11 to 14 percent manganese steel is bolted to the angle member 16 at the forward end of the chute 12 to form a bed knife on which the wooden materials are cut. A discharge chute 32 comprising an upwardly curved receiving plate 33 welded to the angle member 16 at its upstream or receiving end and supported by the legs 11 at its discharge end is positioned below the drum 26 to receive the cut materials and discharge the same from the forward end 24 of the apparatus.

Figure 2:
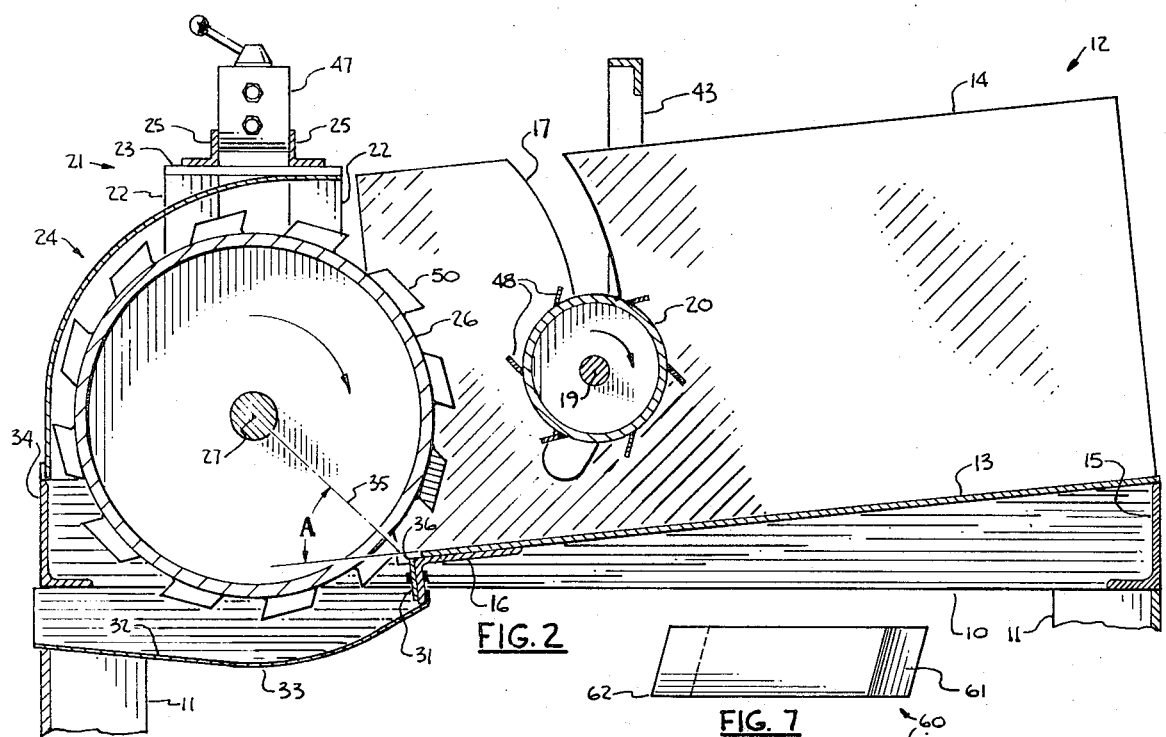
FIG. 2 is a longitudinal sectional view through the apparatus of FIG. 1.

A feature of the invention resides in the geometry of the location of the cutting drum 26 with respect to the floor 13 of the chute 12 and the cutting bar 31. Referring to FIG. 2, a radial plane 35 drawn through the axis 27 of drum 26 and including the cutting edge 36 of the bar 31 is seen to form an acute angle A with the floor 13 of the chute 12. Angle A is small enough that wooden materials such as tree limbs and the like are not drawn under the drum 26 so as to jam the same. The periphery of the drum 26 is seen to depend below the plane of the floor 13. Were angle A of a larger magnitude such that the position of the cutting bar 31 were further to the left as viewed in FIG. 2 and perforce positioned below the present level, wooden materials might be drawn through the discharge chute 32 without being crushed or cut, thereby to jam the drum. If this were the case, the cut pieces might also be too long or stringy.

The angle A is also sufficiently large to facilitate the self feeding of the wooden materials into the space defined by the periphery of the drum 26 and the edge 36 of the cutting bar 31. Stated otherwise, were the angle A of a smaller magnitude such that the position of the cutting bar 31 were upwardly and further to the right as viewed in FIG. 2, wooden materials would tend to impinge upon the periphery of the drum 26 and might not be drawn into a position whereby crushing and cutting are facilitated.

A preferred magnitude for angle A has been found to be about 45°. At this value, jamming of materials in the discharge chute 32 is eliminated, yet flow of materials through the space defined by the periphery of the drum 26 and the edge 36 of the cutting bar 31 is facilitated. The result is that the drum 26 is positioned forwardly of the cutting bar 31 with its periphery depending below the floor 13 of the chute.

The feed roll 20 is journaled between arms 40 pivotally mounted for rotation on bolts 41 received in brackets 42 attached to the rearward vertical angle member 22. The arms 40 are joined by a vertical stiffening frame 43. The roll 20 is powered for rotation in the same direction as the drum 26 through a chain and sprocket drive 44 by a hydraulic motor 45 mounted on a bracket 46 on one arm 40. Motor 45 is supplied by hydraulic fluid through a control valve 47 supported on the angle members 25. The hydraulic fluid may, for example, be supplied by the hydraulic system of the farm tractor. The control valve 47 is adapted to provide both torque and speed controls for the motor 45 such that the roll 20 has a wide range of possible speeds. In this manner light materials are fed to the drum 26 with the roll 20 operating at high speed; bigger and heavier materials are fed with the roll operating t slow speeds.

It should be understood that the roll 20 need not be driven hydraulically in the manner described. It could also be driven by the same means as the drum 26 through suitable speed reducing means. Furthermore, the feeding means to supply the wooden materials to the drum 26 need not comprise the feed roll 20 shown. Such could, for example, take the form of a belt conveyor positioned in a manner to move material along the chute to the cutting station. Other moving means might suitably be employed.

A plurality of transversely extending feeder plates 48 are attached to the periphery of the feed roll 20 as shown. The plates 48 are not positioned radially, but are biased in the direction of rotation of the roll so as to facilitate the feeding of materials to the drum 26. Pivotally supporting the arms 40 on the brackets 42 permits the entire feed roll assembly to rotate about a horizontal axis 49 through the bolts 41, the slots 17 providing the necessary clearance. By this means, the feed roll 20 is enabled to float on the wooden materials in the chute, assuming a higher elevation when more material is in the chute and a lower elevation when less material is present or when the material itself is of a smaller size.

The feed roll 20 is positioned a sufficient distance rearward of the drum 26 such that it will be effective in directing wooden materials to the cutting station, that is, the roll 20 is positioned close enough to the drum 26 to prevent the wood from tipping up as it approaches the cutting bar 31.

Figure 6:
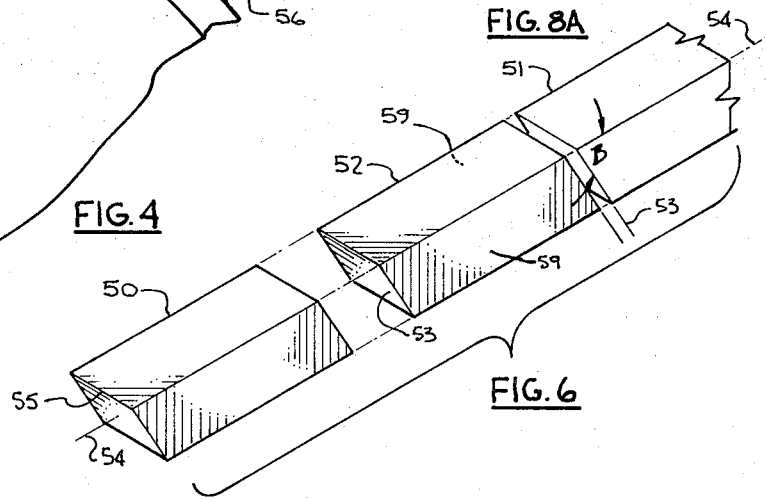
FIG. 6 is a vew illustrating the teeth and the manner in which they are cut from a rectangular bar.
Figure 3:
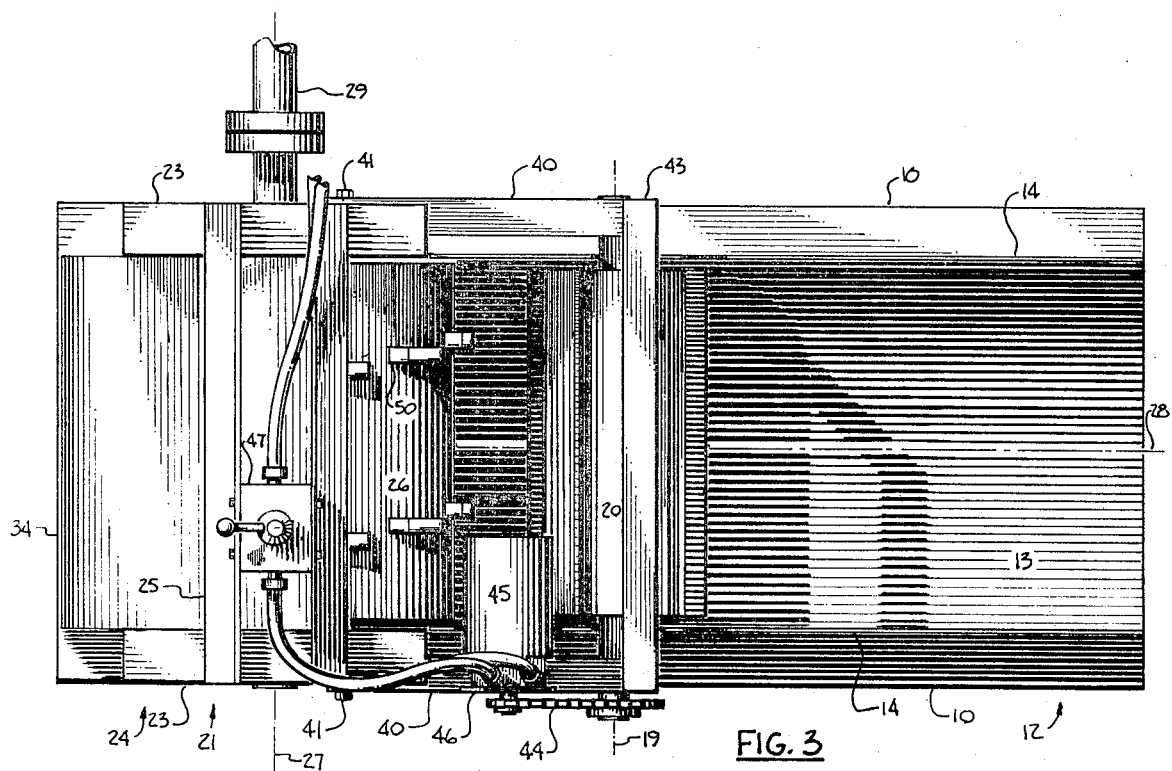
FIG. 3 is a top view of the apparatus.

The cutting teeth 50 which are attached to the periphery of the drum 26 are another feature of the present invention. Referring to FIG. 6, the teeth 50 are made by cutting a one-inch square cross section manganese steel bar 51 containing 11 to 14 percent manganese with an abrasive cutoff blade into three-inch long segments 52. The segments 52 are cut on parallel planes 53 at an acute angle B with the longitudinal axis 54 of the bar 51. Angle B is preferably 50. Manganese steel of this constituency will impact workharden to as high as 550 BHN.

A hard facing rod is then welded to the cutting tip 55 of each cutting tooth 50 so formed and the hard facing material is then ground back to form a cutting edge having increased resistance to impact and abrasive wear. A hard facing electrode suitable for the purpose is that sold under the trademark AMSCO X-53 which has a hardness ranging from 50 to 54 Rockwell C.

Figure 4:
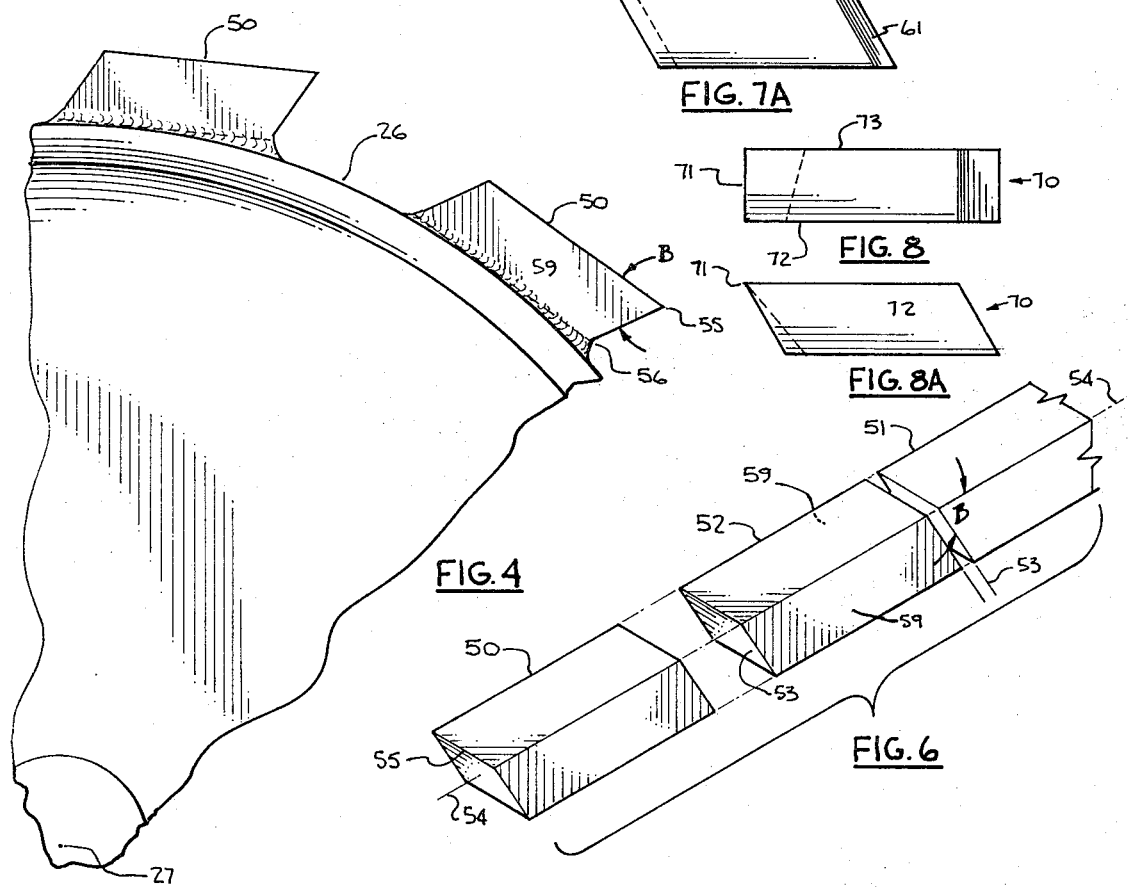
FIG. 4 is a partial end view of the cutting drum illustrating the manner of attachment of the cutting teeth thereto.

The teeth 50 are then welded to the periphery of the drum 26 in a spiral wrap using a welding rod adapted to weld manganese steel to mild carbon steel. A welding rod suitable for the purpose is disclosed in U.S. Pat. No. 3,118,760 and is sold under the trademark AMSCO NICRO-MANG. In the attachment of the teeth 50 to the periphery of the drum 26, a greater thickness of welding material is used at the forward edge 56 than at the rear to achieve a relief. See FIG. 4. I have found that a one-quarter inch thickness of welding material at the front of each tooth gives sufficient relief. The teeth 50 are attached to the periphery of the drum 26 so that the forward cut surfaces 53 are undercut in the direction of rotation of the drum 26 to provide the cutting edges 55. Again see FIG. 4.

Figure 5:
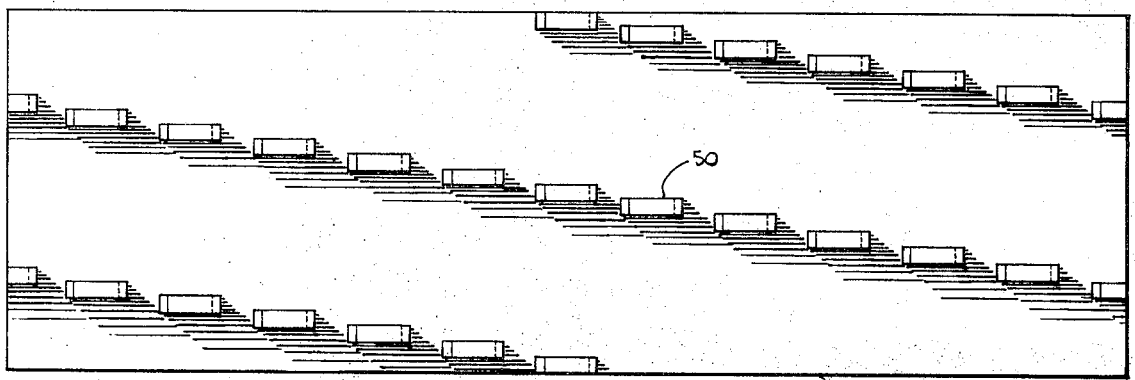
FIG. 5 is a developed view of the surface of the drum illustrating the disposition of the teeth thereon.

Placement of the teeth 50 on the periphery of the drum 26 is as illustrated in FIG. 5. For a drum having an axial length of 20 inches, I have found that 25 teeth disposed in two spiral wraps around the periphery give sufficient overlap. Use of 25 teeth cut from a one-inch cross section bar on a 20 inch long drum results in five inches of such overlap in the two spiral wraps, and this has been found to be satisfactory.

Cutting the teeth on a 50° angle (angle B) increases the strength of the teeth and minimizes breakage. Making the teeth of manganese steel of the composition aforementioned results in an apparatus that can crush, shred and cut any type of wooden material and is immune to breakage notwithstanding the presence of pieces of metal or rock embedded in the wood or included therewith. Manganese steel of the aforementioned constituency also impact workhardens during use, thereby toughening the teeth during the life of the apparatus. If the teeth have to be sharpened, such can be accomplished on the drum.

The geometric relationship between the drum 26 and cutting bar 31 results in an apparatus which can function with the advantageously lesser number of teeth herein disclosed. Using only two spiral wraps of teeth around the periphery of the drum results in a maximum of about four teeth being in any with the work at an time. Fewer teeth create coarser pieces which are desirable in that such exhibit speedier decay characteristics. A lesser number of teeth also requires less feeding force on the part of the roll 20 and effectively results in more cutting power per tooth. Fewer wraps of teeth around the periphery also make it possible to cut bigger material; and the less teeth used on the drum, the less expensive it is to construct the apparatus.

Using teeth having the aforementioned characteristics and positioned as disclosed on the drum results in the wooden materials being crushed, shredded and cut into different sized pieces which do not compact when deposited on the ground and which decay faster than has been known heretofore. The teeth break and crush the wood fibers and this accelerates biological breakdown. The geometric relationship between the drum 26 and cutting bar 31 also results in the formation of many long stringy pieces which help hold a mass of cut pieces together. This is especially desirable if, for example, the pieces are spread on a hillside. Finally, the absence of carbide inserts as are often used in cutting teeth avoids the recurrent breakage to which such teeth are subject.

Figure 7:
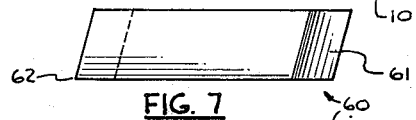
FIG. 7 is a top view of an alternate form of tooth suitable for use with the present invention.
Figure 7A:
FIG. 7A is a side view of the tooth illustrated in FIG 7.

FIG. 7 and 7A illustrate an alternate form of tooth suitable for use with the invention. In this construction, the teeth 60 are cut from the bar 51 along parallel planes 61 which are perpendicular to neither pair of opposed surfaces of the bar. This is in contradistinction to the teeth illustrated in FIGS. 4 and 6 wherein the cutting planes 53 are perpendicular to one pair 59 of opposed surfaces of the bar 51, which pair 59 are disposed perpendicular to the axis 27 of the drum 26 as illustrated. The teeth illustrated in FIG. 7 and 7A perforce strike the material with a cutting point 62 instead of a cutting edge, and this achieves a self-cleaning function.

Figure 8:
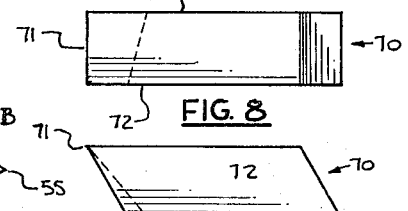
FIG. 8 is a top view of another form of tooth suitable for use with the present invention.
Figure 8A:
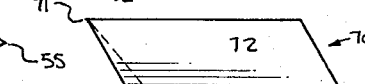
FIG. 8A is a side view of the tooth of FIG. 8.

FIGS. 8 and 8A illustrate another form of tooth 70 suitable for use with the present invention. This tooth has a cutting edge 71 perpendicular to the longitudinal axis 54 of the bar, but is otherwise formed with a skew undercut which increases transversely from one side 72 to the other side 73 as illustrated.

I claim:

1. Apparatus for cutting and shredding wood, comprising
chute means for receiving wooden materials and delivering the same to a cutting station;
a cutting bar mounted on one end of said chute means and having a cutting edge on which said material is adapted to be cut;
a cutting drum adjacent said one end of said chute means, said drum being mounted for rotation about an axis transverse to the longitudinal axis of said chute means,
a radial plane of said cutting drum which includes said cutting edge of said cutting bar forming an acute angle with said floor of said chute means whereby the periphery of said drum depends below said floor of said chute means,
said angle being sufficiently large to facilitate self-feeding of said material through the space defined by said periphery of said drum and said cutting edge of said cutting bar,
said angle being of a magnitude less than the value at which said materials would be drawn under said drum to jam the same;
a plurality of hard metal teeth spirally attached to said periphery of said cutting drum for crushing said wooden materials and cutting the same on said cutting bar,
said teeth comprising segments of a rectangular bar cut on parallel planes at each end thereof, said planes forming an acute angle with the longitudinal axis of said bar,
one of the uncut surfaces of said bar being positioned generally tangential to said periphery of said drum,
the forward surfaces of said teeth being undercut in the direction of rotation of said drum;
means to move said material along said floor of said chute means to said cutting station; and
power means for rotating said drum.

2. Apparatus as in claim 1 in which said angle between said radial plane of said cutting drum and said floor of said chute means is about 45°.

3. Apparatus for crushing and cutting wooden materials comprising
a drum mounted for rotation about a horizontal axis;
a plurality of hard metal teeth attached to the periphery of said drum,
said teeth comprising segments of a rectangular bar cut on parallel planes at each end thereof, said planes forming an acute angle with the longitudinal axis of said bar,
one of the uncut surfaces of said bar being positioned generally tangential to said periphery of said drum,
the forward surfaces of said teeth being undercut in the direction of rotation of said drum;
cutting means positioned adjacent said drum and on which said materials can be cut by said teeth;
means to feed said materials to a position adjacent said drum and said cutting means; and
means to rotate said drum to cause said teeth to cut said materials on said cutting means.

4. Apparatus as in claim 3 in which said teeth comprise manganese steel teeth.

5. Apparatus as in claim 3 in which said parallel planes are parallel to said axis of said drum.

6. Apparatus as in claim 3 in which said rectangular bar comprises a bar of square cross section.

7. Apparatus as in claim 6 in which said teeth are disposed in only two spiral wraps around said periphery of said drum.

8. Apparatus as in claim 3 in which said acute angle between said parallel planes on which said rectangular bar is cut and said longitudinal axis of said bar is about 50°.

* * * * *

UNITED STATES PATENT OFFICE
CERTIFICATE OF CORRECTION

Patent No. 3,801,027          Dated April 2, 1974

Inventor(s) WAYNE H. KUBITZ

It is certified that error appears in the above-identified patent and that said Letters Patent are hereby corrected as shown below:

Column 1, line 66, "vew" should be --view--;

Column 3, line 28, "t" should be --at--;

line 68, after "50" insert --degrees--;

Column 4, line 50, "any" should be --contact-- and

"an" should be --any--.

Signed and sealed this 9th day of July 1974.

(SEAL)
Attest:

McCOY M. GIBSON, JR.          C. MARSHALL DANN
Attesting Officer          Commissioner of Patents